US011629435B2

(12) United States Patent
Ji et al.

(10) Patent No.: US 11,629,435 B2
(45) Date of Patent: Apr. 18, 2023

(54) ELECTROSPUN NANOFIBER MEMBRANE AND METHOD FOR PREPARING ELECTROSPUN NANOFIBER MEMBRANE

(71) Applicants: SHAANXI ENVIRONMENTAL PROTECTION RESEARCH INSTITUTE, Xi'an (CN); SHAANXI RONGNA MATERIAL TECHNOLOGY CO., LTD., Xi'an (CN)

(72) Inventors: Feng Ji, Xi'an (CN); Min Zhang, Baoji (CN); Dong Li, Xi'an (CN); Yifan Lei, Shangluo (CN); Qingyi Wang, Xi'an (CN); Jundong Wang, Bazhong (CN); Hongbo Li, Xi'an (CN)

(73) Assignees: SHAANXI ENVIRONMENTAL PROTECTION RESEARCH INST., Xi'an (CN); SHAANXI RONGNA MATERIAL TECHNOLOGY CO., LTD., Xi'an (CN)

(*) Notice: Subject to any disclaimer, the term of this patent is extended or adjusted under 35 U.S.C. 154(b) by 0 days.

(21) Appl. No.: 17/897,769

(22) Filed: Aug. 29, 2022

(65) Prior Publication Data
US 2023/0082048 A1 Mar. 16, 2023

(30) Foreign Application Priority Data

Sep. 15, 2021 (CN) .......................... 202111078166.1

(51) Int. Cl.
*D01D 1/02* (2006.01)
*D01F 8/08* (2006.01)
(Continued)

(52) U.S. Cl.
CPC ............... *D01D 1/02* (2013.01); *D01D 5/003* (2013.01); *D01F 4/02* (2013.01); *D01D 5/0038* (2013.01);
(Continued)

(58) Field of Classification Search
CPC .... C07K 14/43586; D01D 1/02; D01D 5/003; D01D 5/0038; D01F 4/02; D01F 8/08; D01F 8/10; D01F 8/14; D10B 2505/04
See application file for complete search history.

(56) References Cited

U.S. PATENT DOCUMENTS 3,957,651 A * 5/1976 Kesting ................ B01D 67/003
521/64
6,110,590 A * 8/2000 Zarkoob .............. D01D 5/0038
428/221
(Continued)

FOREIGN PATENT DOCUMENTS

CN 103409939 B * 1/2016
CN 108642719 A * 10/2018 ........... D01D 5/0076
(Continued)

OTHER PUBLICATIONS

Machine translation of CN 108642719A (Year: 2022).*
(Continued)

*Primary Examiner* — Emmanuel S Luk
(74) *Attorney, Agent, or Firm* — Hemisphere Law, PLLC; Zhigang Ma

(57) ABSTRACT

An electrospun nanofiber membrane and a method for preparing the electrospun nanofiber membrane are provided to solve problems of poor mechanical properties, short service life, poor uniformity and consistency of orientation of fibers and poor stability of fiber networks in current electrospun composite nanofiber materials. The electrospun nanofiber membrane is prepared by spinning solution
(Continued)

through a high-voltage electrospinning device. The spinning solution is blending solution of regenerated silk fibroin: polyvinyl alcohol:polylactic acid with a mass ratio being 75-85:10-20:5 dissolved in a mixed solvent of trifluoroacetic acid and dichloromethane with a volume ratio being 7:3. The method establishes a reasonable mass ratio parameter of the regenerated silk fibroin, the polyvinyl alcohol and the polylactic acid to blending spinning to improve spinnability of silk fibroin, as well as prepare the electrospun composite nanofiber membrane with good mechanical properties.

1 Claim, 4 Drawing Sheets

(51) Int. Cl.
    *D01F 8/10*     (2006.01)
    *D01F 8/14*     (2006.01)
    *D01F 4/02*     (2006.01)
    *D01D 5/00*     (2006.01)

(52) U.S. Cl.
    CPC .............. *D01F 8/08* (2013.01); *D01F 8/10* (2013.01); *D01F 8/14* (2013.01); *D10B 2505/04* (2013.01)

(56) References Cited

U.S. PATENT DOCUMENTS

| | | | | |
|---|---|---|---|---|
| 6,221,680 | B1* | 4/2001 | Hakey | H01L 21/0273 257/E21.651 |
| 9,988,746 | B2* | 6/2018 | Dong | D03D 15/587 |
| 2010/0009267 | A1* | 1/2010 | Chase | C04B 35/62259 204/192.12 |
| 2011/0009021 | A1* | 1/2011 | Schoots | D06P 5/08 428/394 |
| 2012/0217453 | A1* | 8/2012 | Lowenthal | C09D 11/52 252/514 |
| 2013/0034674 | A1* | 2/2013 | Yoshida | B32B 5/02 106/217.7 |
| 2014/0162519 | A1* | 6/2014 | Dong | A61F 2/02 428/375 |
| 2014/0335148 | A1* | 11/2014 | Tong | A61K 9/7007 424/443 |
| 2015/0157971 | A1* | 6/2015 | Tong | D01D 5/0076 264/413 |
| 2017/0267837 | A1* | 9/2017 | Yam | D01F 6/94 |
| 2017/0296703 | A1* | 10/2017 | Xie | D01D 10/00 |
| 2019/0054036 | A1* | 2/2019 | Johnson | A61K 47/34 |
| 2020/0039837 | A1* | 2/2020 | Umebayashi | D01D 5/0015 |
| 2020/0109491 | A1* | 4/2020 | Guarino | A61L 27/54 |
| 2020/0277711 | A1* | 9/2020 | Xie | D01D 5/0015 |
| 2021/0010162 | A1* | 1/2021 | Qiao | D01F 6/00 |
| 2021/0308338 | A1* | 10/2021 | Ruane | A61K 47/26 |
| 2022/0047523 | A1* | 2/2022 | Liu | A61F 13/00059 |
| 2022/0096706 | A1* | 3/2022 | Xie | A61L 15/26 |
| 2022/0117888 | A1* | 4/2022 | Jiang | A61K 9/0024 |
| 2022/0154369 | A1* | 5/2022 | Ono | D04H 1/724 |
| 2022/0176283 | A1* | 6/2022 | Umebayashi | D01F 6/625 |

FOREIGN PATENT DOCUMENTS

| | | | | |
|---|---|---|---|---|
| CN | 108754634 | A | * 11/2018 | .......... D01D 5/0076 |
| CN | 111317860 | A | * 6/2020 | |
| KR | 102211550 | B1 | * 1/2021 | |

OTHER PUBLICATIONS

Machine translation of CN108754634A (Year: 2022).*
Machine translation of CN111317860A (Year: 2022).*
Machine translation of CN103409939A (Year: 2022).*
Shaanxi Environmental Protection Research Institute (Applicant), Preliminary amendment with replacement claims (allowed) for invention in CN202111078166.1, dated Apr. 25, 2022.
CNIPA, Notification to grant patent right for invention in CN202111078166.1, dated May 7, 2022.

* cited by examiner

ELECTROSPUN NANOFIBER MEMBRANE AND METHOD FOR PREPARING ELECTROSPUN NANOFIBER MEMBRANE

TECHNICAL FIELD

The disclosure relates to a field of nanofiber material technology, and in particular to an electrospun nanofiber membrane and a method for preparing the electrospun nanofiber membrane.

BACKGROUND

Electrospinning is a simple and effective method for preparing large-scale polymer nanofibers, which mainly uses electrostatic force generated by high voltage to prepare electrostatic nanofiber from one of polymer solutions and polymer melts. With advantages of large specific surface area, high porosity and good fiber continuity, electrospun nanofiber has shown good performance in many fields such as air filtration, adsorption and removal of one of heavy metal ions and multi-component pollutants, and development of modified diversified nanocomposites, and will gradually replace traditional nanofiber materials for a wider range of applications.

Electrospinning process is affected by a variety of parameters, which can be roughly divided into spinning solution parameters, process parameters and environmental parameters. The spinning solution parameters mainly include properties of polymer materials, as well as fraction, conductivity, molecular weight and solvent of the spinning solution; the process parameters mainly include external voltages (positive voltage and negative voltage), flow rate and receiving distance; and the environmental parameters mainly include temperature and humidity. Researches have shown that the parameters can not only significantly affect external morphology of the fibers, but also affect each other. An ideal membrane can be obtained by establishing reasonable equipping conditions. As one of keys to equip the spinning solution, different polymer materials are used by electrospinning to prepare nanofiber with different properties. Therefore, composite nanofiber can be prepared by electrospinning two and more polymer materials. For example, using composite polyvinyl alcohol as a fiber carrier, adding β-cyclodextrin and chitosan as functional monomers, ultrafine fiber membrane materials are prepared by high-voltage electrospinning technology. Then, using cross-linking agent to combine various polymer materials can prepare the composite nanofiber membrane.

However, the process of preparing the composite nanofiber by electrospinning two and more polymer materials solutions and melts is prone to break at a crosslinking point of different polymer materials, resulting in general disadvantages of the composite nanofiber. Firstly, the composite nanofiber has poor mechanical properties and short service life. Secondly, uniformity and consistency of orientation consistency of fibers, and stability of fiber networks are poor.

SUMMARY

An object of the disclosure is to provide an electrospun nanofiber membrane and a method for preparing the electrospun nanofiber membrane. A composite nanofiber membrane is prepared by electrospinning a mixed solution of regenerated silk fibroin, polyvinyl alcohol and polylactic acid, which effectively solves problems of poor mechanical properties and short service life of current electrospun composite nanofiber materials, as well as poor uniformity and consistency of orientation of fibers and poor stability of fiber networks.

In order to achieve the above purposes, technical solutions of an embodiment of the disclosure are as follows.

On the one hand, an electrospun nanofiber membrane is provided in an embodiment of the disclosure, which is prepared by spinning solution through high-voltage electrospinning. The spinning solution is blending solution of the regenerated silk fibroin, the polyvinyl alcohol and the polylactic acid with a mass ratio of the regenerated silk fibroin:the polyvinyl alcohol:the polylactic acid being 75-85:10-20:5 dissolved in a mixed solvent of trifluoroacetic acid and dichloromethane with a volume ratio of the trifluoroacetic acid and the dichloromethane being 7:3.

In an illustrated embodiment of the disclosure, the spinning solution is the blending solution of the regenerated silk fibroin, the polyvinyl alcohol and the polylactic acid with the mass ratio of the regenerated silk fibroin:the polyvinyl alcohol:the polylactic acid being 75:20:5 dissolved in the mixed solvent of the trifluoroacetic acid and the dichloromethane with the volume ratio of the trifluoroacetic acid and the dichloromethane being 7:3.

In an illustrated embodiment of the disclosure, a total mass fraction of the regenerated silk fibroin, the polyvinyl alcohol and the polylactic acid of the spinning solution is at a range of 10 percent weight per volume (% w/v) to 18% w/v.

In an illustrated embodiment of the disclosure, the total mass fraction of the regenerated silk fibroin, the polyvinyl alcohol and the polylactic acid of the spinning solution is 15% w/v.

In an illustrated embodiment of the disclosure, the polylactic acid is poly(l-lactic acid).

In an illustrated embodiment of the disclosure, a molecular weight of the polylactic acid is at a range of $1.00*10^5$ to $1.07*10^5$ molecular weight (Mw).

In an illustrated embodiment of the disclosure, equipping the spinning solution includes:

dissolving the polyvinyl alcohol in the mixed solvent of the trifluoroacetic acid and the dichloromethane with the volume ratio of the trifluoroacetic acid and the dichloromethane being 7:3, heating the solution in a water bath at 80 degrees Celsius (° C.) and magnetically stirring to fully dissolve, adding the polylactic acid and the regenerated silk fibroin according to a mass ratio after cooling down the water bath to 55° C. and obtaining the spinning solution by magnetically stirring in the water bath with 55° C.

On the other hand, a method for preparing the electrospun nanofiber membrane is provided in an embodiment of the disclosure, including:

introducing the spinning solution into a syringe of a high-voltage electrospinning device under conditions of a positive voltage being a range of 40 kilo volts (kV) to 45 kV, a negative voltage being −5 kV, and an injection distance being a range of 15 centimeters (cm) to 18 cm to prepare the electrospun nanofiber membrane.

In an illustrated embodiment of the disclosure, the positive voltage is 40 kV, and the negative voltage is −5 kV.

In an illustrated embodiment of the disclosure, the positive voltage is 40 kV, the negative voltage is −5 kV, and the injection distance is 18 cm.

Compared with the related art, advantages or beneficial effects of the disclosure are as follows.

The electrospun nanofiber membrane provided in the disclosure establishes a reasonable mass ratio parameter of the regenerated silk fibroin, the polyvinyl alcohol and the polylactic acid by blending spinning, so as to improve spinnability of the silk fibroin and while preparing the composite nanofiber membrane of the regenerated silk fibroin, the polyvinyl alcohol and the polylactic acid with good mechanical properties. Tensile strength of the composite nanofiber membrane is at a range of 190 Newton (N) to 270 N. And initial modulus of the composite nanofiber membrane is at a range of 29 cN/tex to 50 cN/tex. Furthermore, filtration performance of the composite nanofiber membrane also has been further improved to achieve over 99.94% in filtration efficiency. In addition, uniformity and consistency of orientation of the regenerated silk fibroin, the polyvinyl alcohol and the polylactic acid composite nanofiber membrane and stability of the fiber networks are also significantly improved.

The electrospun nanofiber membrane prepared by the embodiment of the disclosure establishes reasonable equipping parameters of the electrospinning voltage and the injection distance to prepare the regenerated silk fibroin, the polyvinyl alcohol and the polylactic acid composite nanofiber membrane with the consistency of fiber orientation greatly improved and fiber diameter after the orientation more evenly distributed.

BRIEF DESCRIPTION OF DRAWINGS

In order to explain technical solutions of the embodiments of the disclosure more clearly, the following will briefly introduce attached drawings required in the embodiments. Apparently, the attached drawings in the following description are only some of the embodiments of the disclosure. For those skilled in the art, other drawings can be obtained according to the attached drawings without creative effort.

DETAILED DESCRIPTION OF EMBODIMENTS

Figure 1:
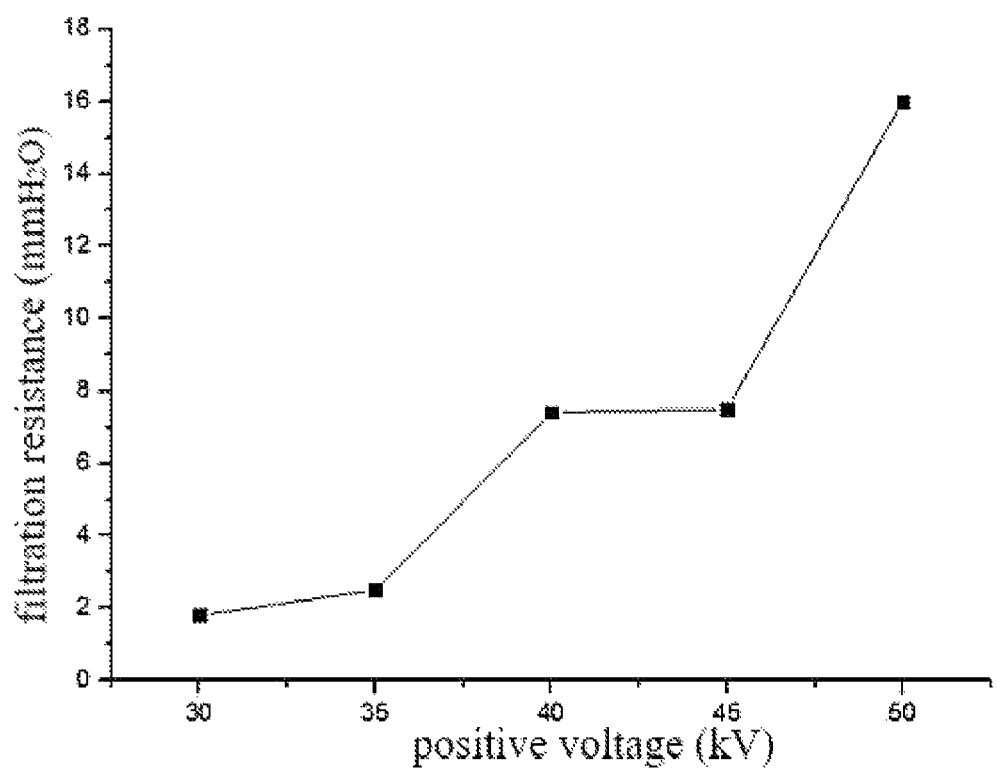
FIG. 1 is a graph of change of a filtration resistance with a positive voltage of an electrospun nanofiber membrane according to an embodiment of the disclosure.

Technical solutions of embodiments of the disclosure will be clearly and completely described below in combination with the embodiments of the disclosure. Apparently, the described embodiments are only some of the embodiments of the disclosure and not all the embodiments of the disclosure. Based on the embodiments of the disclosure, all other embodiments obtained by those skilled in the art without any creative effort belong to the scope of the protection of the disclosure.

In order to solve problems of poor mechanical properties and short service of electrospun composite nanofiber materials in the art as well as poor uniformity and consistency of orientation of fibers and poor stability of fiber networks, an electrospun nanofiber membrane and a method for preparing the electrospun nanofiber membrane are provided.

The electrospun nanofiber membrane is prepared by using spinning solution through high-voltage electro spinning. The spinning solution is blending solution of regenerated silk fibroin, polyvinyl alcohol and polylactic acid with a mass ratio of the regenerated silk fibroin:polyvinyl alcohol:polylactic acid being 75-85:10-20:5 dissolved in a mixed solvent of trifluoroacetic acid and dichloromethane with a volume ratio of the trifluoroacetic acid and the dichloromethane being 7:3.

The electrospun nanofiber membrane provided in the embodiment establishes a reasonable mass ratio parameter of the regenerated silk protein, the polyvinyl alcohol and the polylactic acid by the high-voltage electro spinning to improve spinnability of the silk fibroin, as well as prepare the electrospun composite nanofiber membrane of the regenerated silk fibroin, the polyvinyl alcohol and the polylactic acid composite nanofiber membrane with better mechanical properties. Although the silk fibroin has good biocompatibility, oxygen and water vapor permeability, biodegradability and non-toxic properties as a natural polymer fiber material, the silk fibroin solution is poor in spinnability. In addition, fibroin membrane prepared from pure silk fibroin is hard and brittle, easy to break, which greatly limits practical application of the material. The polyvinyl alcohol not only has excellent hydrophilicity, biocompatibility and degradability, but also has good linear structure as well as flexibility, stable chemical properties and spinnability. It has been shown that blending the regenerated silk fibroin with the polyvinyl alcohol can not only improve the spinnability of the silk fibroin, but also prepare the composite nanofiber with advantages of both the silk fibroin and the polyvinyl alcohol, which can significantly improve mechanical properties. But molecular conformation of the composite nanofiber of the regenerated silk fibroin and the polyvinyl alcohol is dominated by irregular curling of the silk fibroin molecules, which affects mechanical properties and adsorption performance of the composite nanomaterial to some extent. The embodiment of blending spinning the silk fibroin with the polyvinyl alcohol has been shown that adding a certain amount of the polylactic acid can significantly improve alignment rules of the composite nanofiber molecules to obtain a more regular alignment and consistency of orientation of the molecular conformation, so as to further improve the mechanical properties and adsorption performance of the composite nanofiber, which may be due to a crosslinking of functional groups on the polylactic acid and the regenerated silk fibroin. Meanwhile, the polyvinyl alcohol also cross-links with the polylactic acid, so that the molecular conformation of the composite nanofiber changes while the regenerated silk fibroin, the polyvinyl alcohol and the polylactic acid aggregating.

It should be understood by those skilled in the art that as one of the keys, the solvent not only needs to have good solubility, but also has a very important impact on properties of the spinning solution, such as viscosity, conductivity and other parameters. The embodiment has shown that the solvent with the volume ratio of the trifluoroacetic acid and the dichloromethane being 7:3 can obtain better electrospinning effect through a few searches. Therefore, in an illustrated embodiment of the disclosure, the mixed solvent with the volume ratio of the trifluoroacetic acid and the dichloromethane being 7:3 is selected.

It should be understood by those skilled in the art that the regenerated silk fibroin refers to the silk fibroin stripped of sericin, which can be prepared by conventional method. To facilitate understanding, the embodiment provides a method for preparing the regenerated silk fibroin, including placing an appropriate amount of the silk in sodium carbonate solution with a mass fraction of 0.05%, stirring continuously and heating in a water bath at a range of 80° C. to 100° C.

(a bath ratio being 1:50) for 30 minutes, taking off the silk then and rinsing with deionized water, and repeating three times to remove sericin from the silk. The silk fibroin is dissolved in a ternary solvent of calcium chloride, water and ethanol (a molar ratio being 1:8:2) and heating in a water bath at a range of 70° C. to 80° C. (a bath ratio being 1:50). After dissolving the silk fibroin, the silk fibroin is placed at room temperature to cool down and then centrifuged at 8000 rounds for each minute for 10 min, filtered, and taken supernatant. The mixed solution of the silk fibroin and the ternary solvent is obtained by centrifugation. Then, the mixed solution is dialyzed and filtered by dialysis bag, and then the regenerated silk fibroin is obtained by freeze-drying technology.

The embodiment also provides the method for preparing the spinning solution, which includes: adding the polyvinyl alcohol in the mixed solvent of the trifluoroacetic acid and the dichloromethane with the volume ratio of the trifluoroacetic acid and the dichloromethane being 7:3 to obtain a mixture, heating the mixture in water bath heating with 80° C. and magnetically stirring to fully dissolve the polyvinyl alcohol in the mixed solution to obtain a dissolved mixture, adding poly(l-lactic acid) and the regenerated silk fibroin in the dissolved mixture to obtain a second mixture after cooling down the water bath to 55° C. and obtaining the spinning solution by magnetically stirring the second mixture in the water bath with 55° C.

The method for preparing the spinning solution provided in the embodiment, by dissolving the polyvinyl alcohol in the water bath heating with 80° C., can not only accelerates dissolution of the polyvinyl alcohol, but also improve process properties of the polyvinyl alcohol as well as adjust viscosity of the solution. Then, adding the polylactic acid and the regenerated silk fibroin to the polyvinyl alcohol in the water bath and heating with 55° C. not only promotes better dissolution of the polylactic acid and the regenerated silk fibroin in the polyvinyl alcohol solution, but also enables good control of properties of the spinning solution, thus establishes a reasonable equipping parameter for preparing the spinning solution.

The method for preparing the electrospun nanofiber membrane is provided, which is achieved by an electrospinning device, including: introducing the spinning solution into a syringe of the high-voltage electrospinning device under conditions of a positive voltage being a range of 40 kV to 45 kV, a negative voltage being −5 kV and an injection distance being a range of 15 cm to 18 cm.

It should be understood by those skilled in the art that in order to establish better electrospinning conditions, the embodiments investigate an effect of the spinning solution parameters (mass ratio of the regenerated silk fibroin, the polyvinyl alcohol and the polylactic acid and mass fraction of the solution) and process parameters (voltage and receiving distance) on appearance morphology and filtration performance of the composite nanofiber.

(1) The embodiment has studied an effect of a mass ratio of the regenerated silk fibroin, the polyvinyl alcohol and the polylactic acid on micro-morphology of the electrospun nanofiber by using single factor analysis. Under conditions of the total mass fraction being 15%, the positive voltage being 40 kV, the negative voltage being −5 kV, a spinning solution speed being 0.001 millimeters/second (mm/s), and the fiber receiving distance being 18 cm, the appearance morphology of different nanofiber formed by establishing the mass ratio of the regenerated silk fibroin:the polyvinyl alcohol:the polylactic acid being 75:20:5, 80:15:5 and 85:10:5 respectively has been studied. The results have shown that the spinning solution performs relatively well in the electrospinning process when using the regenerated silk fibroin, the polyvinyl alcohol and the polylactic acid as polymer materials and using the trifluoroacetic acid and the dichloromethane as the mixed solvent. While the mass ratio of the regenerated silk fibroin:the polyvinyl alcohol:the polylactic acid being 75-85:10-20:5, diameter of the nanofiber by spinning is particularly thin and uniform and the appearance morphology of the fiber is relatively smooth. Moreover, the spinning process is continuous, and the Taylor cone and jet flow are stable. While the mass ratio of the regenerated silk fibroin:the polyvinyl alcohol:the polylactic acid being 75:20:5, the uniformity of the nanofiber by spinning and continuity of the spinning process are the best. While the mass ratio of the regenerated silk fibroin:the polyvinyl alcohol:the polylactic acid being one of more and less than 75-85:10-20:5, it is also possible to form the nanofiber by spinning, but the uniformity of the diameter of the nanofiber is relatively poor. Therefore, the embodiment of the disclosure selects the mass ratio of the regenerated silk fibroin:the polyvinyl alcohol:the polylactic acid being 75-85:10-20:5 to blending spinning. In an illustrated embodiment, the mass ratio of the regenerated silk fibroin: the polyvinyl alcohol:the polylactic acid is 75-85:10-20:5, which not only improves the spinnability of the regenerated silk fibroin and the polylactic acid, but also improves the appearance morphology of the nanofiber, and obtains the finer diameter and more uniform nanofiber.

(2) The embodiment has studied an effect of a total mass fraction of the regenerated silk fibroin, the polyvinyl alcohol and the polylactic acid on the micro-morphology of the nanofiber by using the single factor analysis. Under conditions of the mass ratio of the regenerated silk fibroin:the polyvinyl alcohol:the polylactic acid being 75:20:5, the positive voltage being 40 kV, the negative voltage being −5 kV, the spinning speed being 0.001 mm/s, and the fiber receiving distance being 18 cm, the appearance morphology and the diameter of different nanofiber formed by designing the total mass fraction of the regenerated silk fibroin, the polyvinyl alcohol and the polylactic acid being 10%, 12%, 15%, 18% and 20% respectively have been studied. The results have shown that the diameter of the nanofiber is 192 nanometers (nm) in average, distributed more widely and finer but poor in the uniformity under the condition of the total mass fraction of the regenerated silk fibroin, the polyvinyl alcohol and the polylactic acid being 10%. The diameter of the nanofiber is 231 nm in average, distributed more narrowly, finer and better in the uniformity under the condition of the total mass fraction of the regenerated silk fibroin, the polyvinyl alcohol and the polylactic acid being 12%. The diameter of the nanofiber is 272 nm in average, distributed very narrowly, finer and better in the uniformity under the condition of the total mass fraction of the regenerated silk fibroin, the polyvinyl alcohol and the polylactic acid being 15%. The diameter of the nanofiber is 308 nm in average, distributed more narrowly, finer and better in the uniformity under the condition of the total mass fraction of the regenerated silk fibroin, the polyvinyl alcohol and the polylactic acid being 18%. The diameter of the nanofiber is 438 nm in average, distributed more widely, coarser and poor in the uniformity under the condition of the total mass fraction of the regenerated silk fibroin, the polyvinyl alcohol and the polylactic acid being 20%. Therefore, the total mass fraction of the regenerated silk fibroin, the polyvinyl alcohol and the polylactic acid has a significant effect on the diameter and the uniformity of the fiber. The diameter of the fiber will increase accordingly with an increasing of the total mass fraction of the regenerated silk fibroin, the polyvinyl alcohol and the polylactic acid, and the diameter and the uniformity of the nanofiber prepared at different mass fraction are different. Based on the diameter and the uniformity of the nanofiber, the embodiment of the disclosure selects the total mass fraction of the regenerated silk fibroin, the polyvinyl alcohol and the polylactic acid being a range of 10% w/v to 18% w/v. In an illustrated embodiment, the total mass fraction of the regenerated silk fibroin, the polyvinyl alcohol and the polylactic acid is 15% w/v.

(3) The embodiment has studied an effect of electrospinning voltage on the filtration performance of the nanofiber membrane by using the single factor analysis. Under conditions of the mass ratio of the regenerated silk fibroin:the polyvinyl alcohol:the polylactic acid being 75:20:5, the total mass fraction being 15%, the spinning solution speed being 0.001 mm/s, the fiber receiving distance being 18 cm, and the negative voltage being −5 kV, the filtration resistance and the filtration efficiency of different composite nanofiber membrane formed by designing the positive voltage being 30 kV, 35 kV, 40 kV, 45 kV and 50 kV respectively have been studied. The results have shown in Table 1, FIG. 1 and FIG. 2. Table 1 shows the filtration resistance and the filtration efficiency of the nanofiber membrane at different spinning voltage. FIG. 1 shows a graph of change of the filtration resistance with the positive voltage of the nanofiber membrane. And FIG. 2 shows a histogram of change of the filtration efficiency with the positive voltage of the nanofiber membrane.

TABLE 1 filtration performance of the nanofiber membrane prepared by different electrospinning voltage.

| Spinning voltage | Filtration resistance/ millimeter $H_2O$ | Filtration efficiency % |
| --- | --- | --- |
| 30 kV | 1.8 | 91.49 |
| 35 kV | 2.5 | 95.33 |
| 40 kV | 7.4 | 99.96 |
| 45 kV | 7.5 | 99.94 |
| 50 kV | 16.0 | 96.72 |

Figure 2:
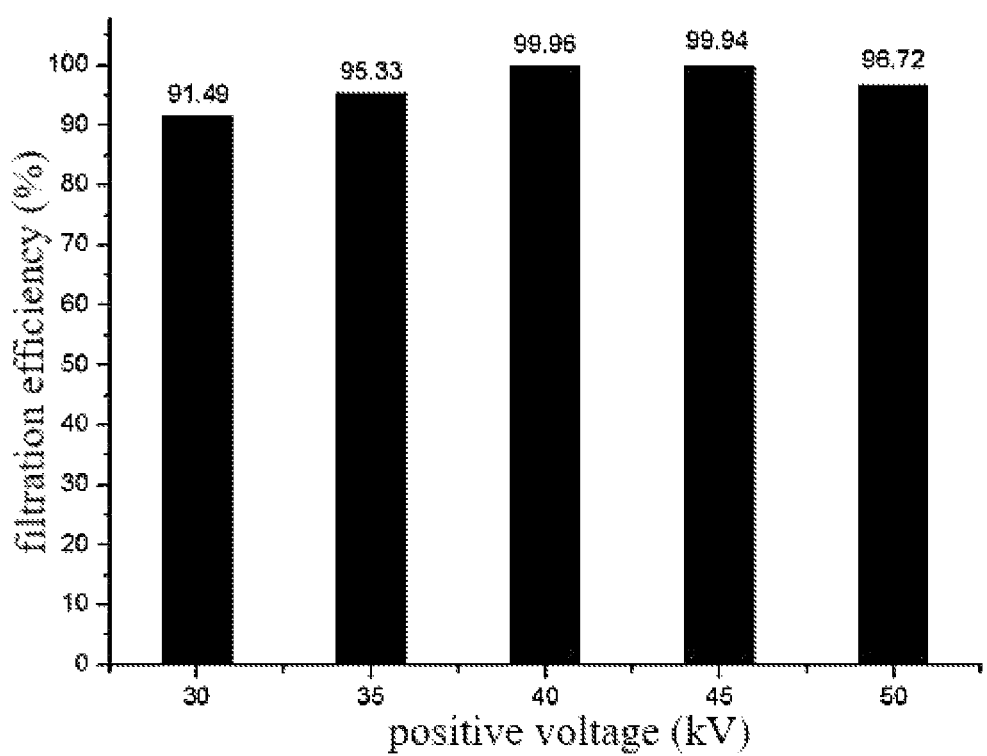
FIG. 2 is a histogram of change of filtration efficiency with a positive voltage of an electrospun nanofiber membrane according to an embodiment of the disclosure.

Reference to Table 1, FIG. 1 and FIG. 2, the filtration performance of the nanofiber membrane has gradually increased with an increase of the positive voltage. Due to the higher the voltage, the pulling force of point field on the extruded solution and on the fiber in an electric field, the smaller the diameter of the fiber that are finally received, and the smaller the pore size formed by the stacking of the fiber. But with a trend of increasing voltage, the spinning and receiving process gradually become unstable, so the filtration efficiency decreases slightly. The filtration efficiency achieves the highest 99.96% with the positive voltage of 40 kV. At the same time, the embodiment of the disclosure selects the positive voltage being a range of 40 kV to 45 kV for electrospinning with a requirement for stability of the filtration resistance. In an illustrated embodiment, the positive voltage is 40 kV.

Figure 3:
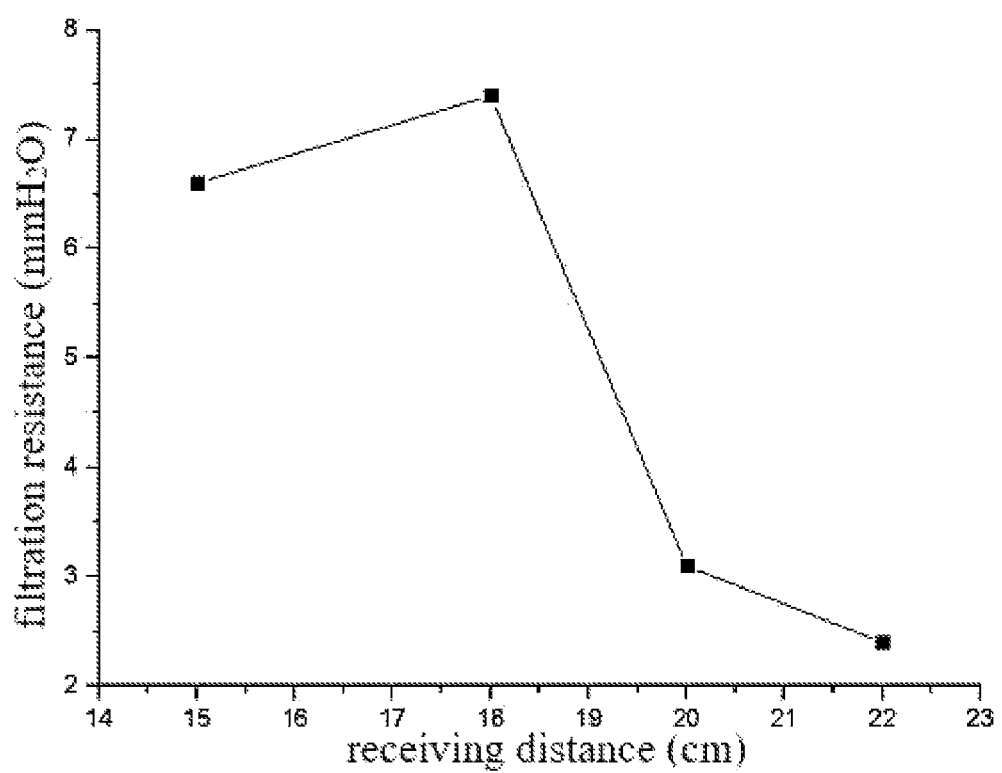
FIG. 3 is a graph of change of a filtration resistance with a receiving distance of an electrospun nanofiber membrane according to an embodiment of the disclosure.

(4) The embodiment has studied an effect of the receiving distance on the filtration performance of the nanofiber membrane by using the single factor analysis. Under conditions of the mass ratio of the regenerated silk fibroin:the polyvinyl alcohol:the polylactic acid being 75:20:5, the total mass fraction being 15%, the positive voltage being 40 kV, the negative voltage being −5 kV, and the spinning solution speed being 0.001 mm/s, the filtration resistance and the filtration efficiency of different nanofiber membrane by designing the receiving distance being 12 cm, 15 cm, 18 cm, 20 cm and 22 cm respectively have been studied. The results have shown in Table 2, FIG. 3 and FIG. 4. Table 2 shows the filtration resistance and the filtration efficiency of the nanofiber membrane with different spinning voltage. FIG. 3 shows a graph of change of the filtration resistance with the receiving distance of the nanofiber membrane. And FIG. 4 shows a histogram of change of the filtration efficiency with the receiving distance of the nanofiber membrane.

TABLE 2 filtration performance of the nanofiber membrane prepared under different receiving distance.

| Receiving distance | Filtration resistance/ $mmH_2O$ | Filtration efficiency % |
| --- | --- | --- |
| 12 cm | — | — |
| 15 cm | 6.6 | 99.73 |
| 18 cm | 7.4 | 99.96 |
| 20 cm | 3.1 | 91.40 |
| 22 cm | 2.4 | 82.92 |

Figure 4:
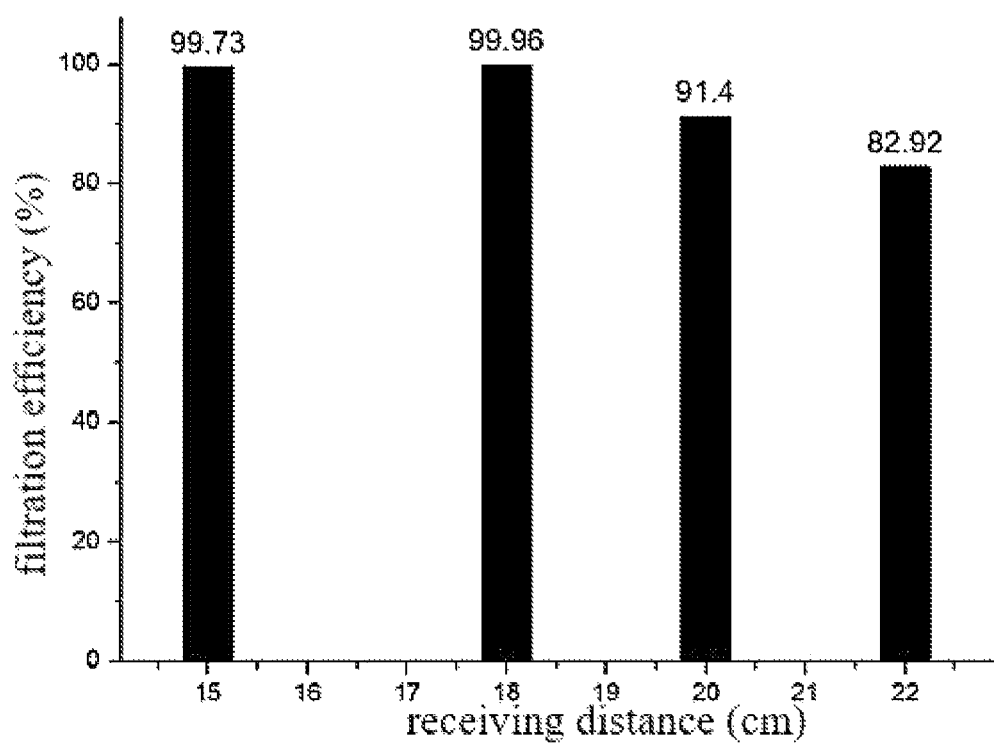
FIG. 4 is a histogram of change of filtration efficiency with a receiving distance of an electrospun nanofiber membrane according to an embodiment of the disclosure.

Reference to Table 1, FIG. 3 and FIG. 4, the filtration performance of the nanofiber membrane has increased firstly and then decreased with an increase of the receiving distance. When the receiving distance is 12 cm, the spinning process is unstable because of the very short receiving distance, so it is difficult to receive the fiber, and difficult to prepare the nanofiber membrane with good performance. When the receiving distance is at a range of 15 cm to 22 cm, the filtration performance of the nanofiber membrane increases firstly and then decreases. When the receiving distance is 18 cm, the filtration performance of the nanofiber membrane achieves the highest in 99.96%. However, when the receiving distance is at a range of 20 cm to 22 cm, the filtration efficiency of the nanofiber membrane decreases apparently. Therefore, the embodiment of the disclosure selects the receiving distance being a range of 15 cm to 18 cm. In an illustrated embodiment, the receiving distance is 18 cm.

On the other hand, the embodiment has investigated an effect of a mass ratio of the regenerated silk fibroin, the polyvinyl alcohol and the polylactic acid on porosity and conformation of the composite nanofiber.

The embodiment has studied an effect of a mass ratio of regenerated silk fibroin, polyvinyl alcohol and polylactic acid on porosity and conformation of the composite nanofiber by using the single factor analysis. Under conditions of the total mass fraction being 15%, the positive voltage being 40 kV, the negative voltage being −5 kV, the spinning solution speed being 0.001 mm/s and the fiber receiving distance being 18 cm, the porosity and the conformation of different composite nanofiber by establishing the mass ratio of the regenerated silk fibroin, the polyvinyl alcohol and the polylactic acid being 75:20:5, 80:15:5 and 85:10:5 respectively have been studied. The results have shown that when the mass ratio of the regenerated silk fibroin:the polyvinyl alcohol:the polylactic acid is 75-85:10-20:5, the porosity of the composite nanofiber reaches more than 97% and a conversion rate of the molecular conformation from irregular curling to regular alignment reaches 16.05%. When the mass ratio of the regenerated silk fibroin:the polyvinyl alcohol:the polylactic acid is 75:20:5, the porosity of the nanofiber membrane reaches the highest 98.8% and the conversion rate of the molecular conformation from irregular curling to regular alignment reaches 16.70%. Therefore, the embodiment of the disclosure selects the mass ratio of the regenerated silk fibroin:the polyvinyl alcohol:the polylactic acid being 75-85:10-20:5. In an illustrated embodiment, the mass ratio of the regenerated silk fibroin:the polyvinyl alcohol:the polylactic acid is 75-85:10-20:5.

Poly(l-lactic acid) is a kind of biodegradable polymer material, which is non-toxic, non-irritating, biodegradable, absorbable, high strength, good plasticity and easy processing. The poly(l-lactic acid), the regenerated silk fibroin and the polyvinyl alcohol blending spinning can produce the composite nanofiber membrane with better mechanical properties. Therefore, the embodiment of the disclosure selects the poly-l-lactic acid, the regenerated silk fibroin and the polyvinyl alcohol for blending spinning.

Molecular weight of the polylactic acid has a great influence on mechanical properties formed by electrospinning. The embodiment has investigated an effect of the molecular weight of the polylactic acid on the porosity and the conformation of the composite nanofiber, including studying mechanical properties of the nanofiber formed by different molecular weight of the polylactic acid under conditions of the total mass fraction being 15%, the positive voltage being 40 kV, the negative voltage being −5 kV, the spinning solution speed being 0.001 mm/s, the fiber receiving distance being 18 cm, and the mass ratio of the regenerated silk fibroin:the polyvinyl alcohol:the polylactic acid being 75:20:5. The results have shown that the mechanical properties of the nanofiber perform better when the molecular weight of the polylactic acid is at a range of $1.00 \times 10^5$ Mw to $1.07 \times 10^5$ Mw, in which the tensile strength of the nanofiber reaches a range of 150 N to 270 N and the initial modulus is at a range of 29 cN/tex to 50 cN/tex. Therefore, the embodiment of the disclosure selects the polylactic acid with the molecular weight being a range of $1.00 \times 10^5$ Mw to $1.07 \times 10^5$ Mw for blending spinning with the polyvinyl alcohol and the regenerated silk fibroin.

For those skilled in the field, the disclosure is not limited by details of the above exemplary embodiments. The disclosure can be realized in other embodiments without departing from the spirit or basic properties of the disclosure. Therefore, the embodiments should be considered exemplary and unlimited in all aspects. The scope of the disclosure is defined by attached claims rather than by the above descriptions. All variations within the meaning and the scope of equivalent element of claims should be included in the disclosure.

What is claimed is:

1. A method for preparing an electrospun nanofiber membrane, comprising:
   adding polyvinyl alcohol in a mixed solution of trifluoroacetic acid and dichloromethane with a volume ratio of the trifluoroacetic acid and the dichloromethane being 7:3 to obtain a mixture;
   heating the mixture in water bath with 80 degrees Celsius (° C.) and magnetically stirring the mixture to fully dissolve the polyvinyl alcohol in the mixed solution to obtain a dissolved mixture;
   adding poly(l-lactic acid) and regenerated silk fibroin in the dissolved mixture to obtain a second mixture after cooling down the water bath to 55° C. and obtaining a spinning solution by magnetically stirring the second mixture in the water bath with 55° C.;
   wherein a total mass fraction of the regenerated silk fibroin, the polyvinyl alcohol and the poly(l-lactic acid) in the spinning solution is 15 percent weight per volume (% w/v); and
   wherein a mass ratio of the regenerated silk fibroin:the polyvinyl alcohol:the poly(l-lactic acid) is 75:20:5;
   introducing the spinning solution into a syringe of an electrospinning device under conditions of a positive voltage being 40 kilo volts (kV), a negative voltage being −5 kV and an injection distance being 18 centimeters (cm) to prepare the electrospun nanofiber membrane.

* * * * *